(12) United States Patent
Dong

(10) Patent No.: US 9,681,273 B2
(45) Date of Patent: Jun. 13, 2017

(54) INFRASTRUCTURE SERVICE INFORMATION COMMUNICATION DEVICE AND METHOD

(75) Inventor: Xiandong Dong, Guangdong (CN)

(73) Assignee: Yulong Computer Telecommnication Technologies (Shenzhen) Co., Ltd., Shenzhen (CN)

( * ) Notice: Subject to any disclaimer, the term of this patent is extended or adjusted under 35 U.S.C. 154(b) by 245 days.

(21) Appl. No.: 14/405,230

(22) PCT Filed: Jun. 4, 2012

(86) PCT No.: PCT/CN2012/076450
§ 371 (c)(1),
(2), (4) Date: Jan. 14, 2015

(87) PCT Pub. No.: WO2013/181787
PCT Pub. Date: Dec. 12, 2013

(65) Prior Publication Data
US 2015/0146606 A1    May 28, 2015

(51) Int. Cl.
*H04W 4/06* (2009.01)
*H04L 5/00* (2006.01)
*H04W 52/02* (2009.01)

(52) U.S. Cl.
CPC .............. *H04W 4/06* (2013.01); *H04L 5/0048* (2013.01); *H04W 52/0216* (2013.01); *H04W 52/0229* (2013.01); *Y02B 60/50* (2013.01)

(58) Field of Classification Search
CPC .............. H04W 52/0216; H04W 4/06; H04W 52/0229; H04L 5/0048
See application file for complete search history.

(56) References Cited

U.S. PATENT DOCUMENTS

2003/0211855 A1\* 11/2003 Sarkkinen ........... H04W 72/005
455/466
2011/0153773 A1    6/2011 Vandwalle et al.

FOREIGN PATENT DOCUMENTS

| CN | 1976344 A | 6/2007 |
|---|---|---|
| CN | 101321026 A | 12/2008 |
| CN | 102026099 A | 4/2011 |

\* cited by examiner

*Primary Examiner* — Gbemileke J Onamuti
(74) *Attorney, Agent, or Firm* — Rudy J. Ng; Bret E. Field; Bozicevic, Field & Francis LLP

(57) ABSTRACT

An infrastructure service information communication device and an infrastructure service information communication method are provided. The infrastructure service information communication device and the infrastructure service information communication method allow an STA to save a large amount of power in a process of carrying out infrastructure network service information discovery, which is also favorable for power saving of those STAs that are not engaged in the infrastructure network service information discovery.

20 Claims, 4 Drawing Sheets

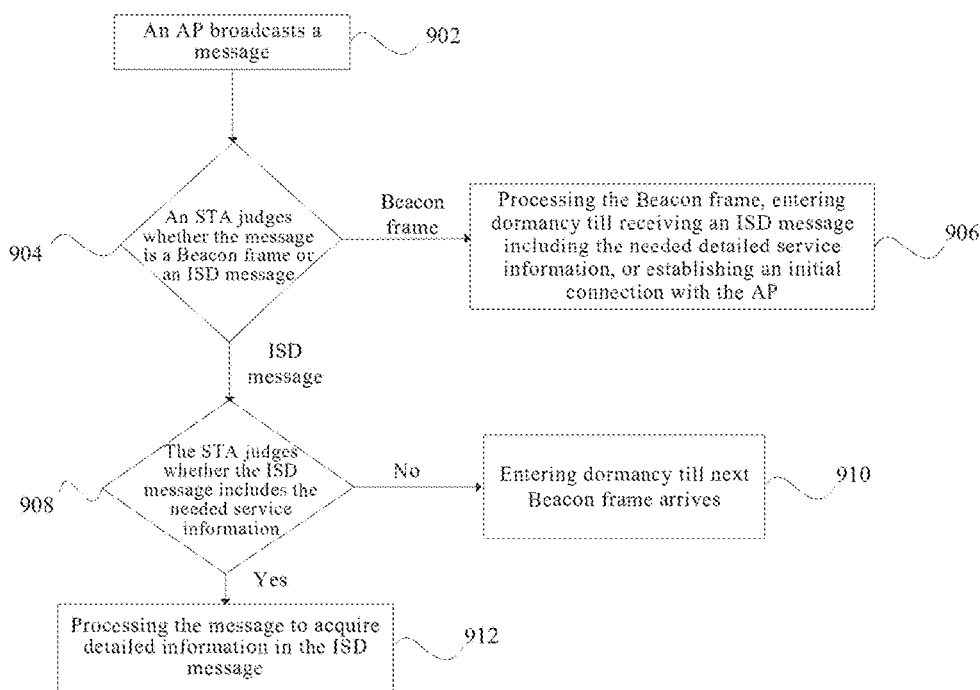

INFRASTRUCTURE SERVICE INFORMATION COMMUNICATION DEVICE AND METHOD

FIELD OF THE INVENTION

The present invention relates to the technical field of communications, and in particular relates to an infrastructure service information communication device and an infrastructure service information communication.

BACKGROUND OF THE INVENTION

In IEEE (Institute of Electrical and Electronics Engineers) 802.11, a new project team ISD (infrastructure service discovery) was established by RIM (research in motion) Company in November, 2011. The main aim of this project team is to research how an STA (station) discovers infrastructure service information and how an AP (access point) of a network side informs the STA of its own service information under the condition that no initial connection is established between the STA and the AP.

Since the project is being at a research stage, only application scenarios and demands are proposed, but substantial solutions are not proposed, the present invention proposes a solution, that is, the AP broadcasts an index message of its service information and appearance time of a specific message of the index message in a Beacon frame. Considering that the detailed information of the infrastructure service information should be very long, an infrastructure service information discovery (ISD) message may not include all the detailed information but only include the detailed information of a catalogue index, and then the following problems are caused.

1. If the broadcast message only includes the detailed information of a catalogue index, the STA may not receive a catalogue index message broadcasted by the AP previously, that is, a Beacon frame, but only receives the broadcast message; if the broadcast message does not include the detailed information which the STA wants to learn after analyzing, the STA must wait till receiving the infrastructure service information to be learnt; since the time point information of the detailed infrastructure service information to be learnt is not received previously, this period of time is unknown, that is to say, the STA must be kept in a wake-up state in this period of time; whether each received broadcast message is the desired infrastructure service information is judged by analyzing; and due to massive analyzing operation and waiting time, the STA would consume a large amount of power, which is not favorable for power saving of the STA.

2. For those STAs which do not need to learn the infrastructure service information provided by the AP but receive this ISD broadcast message, the STAs may carry out other services with the AP, e.g. surfing the Internet and the like. Each STA needs to wait for next Beacon frame to continue a service and may not judge how many ISD broadcast messages are needed before the Beacon frame appears in addition to this broadcast message from this ISD message, the STA must receive and analyze each ISD message in this period of time, and a large amount of power is consumed during analyzing and other operations of these ISD messages, which is not favorable for power saving of a terminal; or, if the ISD message received by the STA includes all service information of the AP, the message is very long, and if the STA may not judge whether this message is an ISD message from a physical frame header of this ISD message, the STA must receive and analyze the whole ISD message, and the STA would consume a large amount of power in the processing process, which is not favorable for power saving of the STA.

Therefore, to solve the above problems and ensure that the STA does not excessively consume power at the same time, a new technical scheme needs to be proposed, so that after the STA receives the broadcast message of the AP, the STA may judge the type of the received broadcast message from a physical frame header or an MAC frame header of the broadcast message, may judge whether this broadcast message is the desired information according to the type of the broadcast message and does not need to receive all broadcast messages for analyzing, which is favorable for power saving of the STA.

SUMMARY OF THE INVENTION

For solving the aforementioned two problems and ensuring that an STA does not excessively consume power at the same time, the present invention needs to propose a new technical scheme, so that after the STA receives a broadcast message of an AP, the STA may judge the type of the received broadcast message from a physical frame header or an MAC frame header of the broadcast message, may judge whether this broadcast message is the desired information according to the type of the broadcast message and does not need to receive all broadcast messages for analyzing, which is favorable for power saving of the STA.

In view of this, the present invention provides an infrastructure service information communication device, including: a service processing module, configured to generate a broadcast message, wherein a physical frame header and/or a media access control frame header of the broadcast message include an identification information bit, the value of the identification information bit is a first value when the broadcast message is an infrastructure service information discovery message, and the infrastructure service information discovery message includes specific information of infrastructure service information; and a wireless transceiving module, configured to exchange data with the outside of the infrastructure service information communication device, wherein the service processing module transmits the broadcast message via the wireless transceiving module. In this technical scheme, the infrastructure service information communication device may be a router, a mobile phone, a flat computer, a notebook computer or the like and may be used as an AP, the service processing module is equivalent to a chip for processing wireless local area network services, and the wireless transceiving module is equivalent to an antenna for transceiving wireless local area network signals. Through this scheme, when the AP transmits the ISD message including the specific service information, the AP may identify the ISD message, then when the STA receives a message, the STA may judge whether the message is an ISD message only by reading the physical frame header or the MAC frame header of the ISD message without analyzing all ISD messages, and when the STA does not need the infrastructure service information, the STA does not analyze the ISD message, thus saving power for the STA.

In the above technical scheme, preferably, the identification information bit includes one or more bits in a signal domain of the physical frame header, and/or one or more bits in a frame control domain of the media access control frame header. In this technical scheme, the implemented identification is simple and feasible, and it is ensured that the STA may judge whether the message is an ISD message according to the value of the specific bit of the physical frame header or the MAC frame header and does not need to analyze the specific information therein, so that power is saved. In the above technical scheme, preferably, the identification information bit includes an infrastructure service discovery (ISD)/beacon frame message indication bit in the signal domain of the physical frame header, and/or one or more bits in a type sub-domain and a subtype sub-domain of the frame control domain of the media access control frame header. In this technical scheme, a reserved bit (serving as the ISD/Beacon message indication bit) of the SIG (signal) domain in the physical frame header and the Type sub-domain and the Subtype sub-domain in the FC (Frame Control) domain of the MAC frame header may be used for setting an identification. Those skilled in the art should understand that, based on the format change of the ISD message, the identification information may also be set by selecting other bits.

In the above technical scheme, preferably, the infrastructure service information discovery message further includes a timestamp and a beacon interval. In this technical scheme, after the AP adds the Beacon Interval and the timestamp to the ISD message, the STA may know the arrival time of next Beacon frame according to the Beacon Interval, and it is ensured that the STA may be synchronized with the AP on time according to the timestamp, and if the ISD message received by the STA is not the information needing to be learnt by the STA, the STA may directly enter dormancy till the next Beacon frame arrives, which is favorable for saving power for the STA.

In the above technical scheme, preferably, the service processing module is also configured to set the value of the identification information bit as a second value when the broadcast message is a beacon frame, wherein the beacon frame includes an index message of the infrastructure service information and broadcast time points of all corresponding specific information of the index message. In this technical scheme, if the identification information bit is set in the physical frame header of the Beacon frame, it may be ensured that after the STA receives a message, the STA may judge whether the message is a Beacon frame only according to the physical frame header, and then the STA may further analyze the MAC frame part of the received message to obtain the needed information, or an initial connection is directly established between the STA and the AP.

The present invention further provides an infrastructure service information communication method, including: generating a broadcast message, wherein a physical frame header and/or a media access control frame header of the broadcast message include an identification information bit; the value of the identification information bit being a first value when the broadcast message is an infrastructure service information discovery message, wherein the infrastructure service information discovery message includes specific information of infrastructure service information; and transmitting the broadcast message. In this technical solution, when the AP transmits the ISD message including the specific service information, the AP may identify the ISD message, then when the STA receives a message, the STA may judge whether the message is an ISD message only by reading the physical frame header or the MAC frame header of the ISD message without analyzing all ISD messages, and when the STA does not need the infrastructure service information, the STA does not analyze the ISD message, thus saving power for the STA.

In the above technical scheme, preferably, the identification information bit includes one or more bits in a signal domain of the physical frame header, and/or one or more bits in a frame control domain of the media access control frame header. In this technical scheme, the implemented identification is simple and feasible, and it is ensured that the STA may judge whether the message is an ISD message according to the value of the specific bit of the physical frame header or the MAC frame header and does not need to analyze the specific information therein, so that power is saved. In the above technical scheme, preferably, the identification information bit includes an infrastructure service discovery (ISD)/beacon frame message indication bit in the signal domain of the physical frame header, and/or one or more bits in a type sub-domain and a subtype sub-domain of the frame control domain of the media access control frame header. In this technical scheme, a reserved bit (serving as the ISD/Beacon message indication bit) of the SIG (signal) domain in the physical frame header and the Type sub-domain and the Subtype sub-domain in the FC (Frame Control) domain of the MAC frame header may be used for setting an identification. Those skilled in the art should understand that, based on the format change of the ISD message, the identification information may also be set by selecting other bits.

In the above technical scheme, preferably, the infrastructure service information discovery message further includes a timestamp and a beacon interval. In this technical scheme, after the AP adds the Beacon Interval and the Timestamp to the ISD message, the STA may know the arrival time of next Beacon frame according to the Beacon Interval, and it is ensured that the STA may be synchronized with the AP on time according to the timestamp, and if the ISD message received by the STA is not the information needing to be learnt by the STA, the STA may directly enter dormancy till the next Beacon frame arrives, which is favorable for saving power for the STA.

In the above technical scheme, preferably, the value of the identification information bit is a second value when the broadcast message is a beacon frame, wherein the beacon frame includes an index message of the infrastructure service information and broadcast time points of all corresponding specific information of the index message. In this technical scheme, if the identification information bit is set in the physical frame header of the Beacon frame, it may be ensured that after the STA receives a message, the STA may judge whether the message is a Beacon frame only according to the physical frame header, and then the STA may further analyze the MAC frame part of the received message to obtain the needed information or carry out an initial connection with the AP.

The present invention further provides an infrastructure service communication device, including: a service processing module, configured to receive a broadcast message via a wireless transceiving module, wherein when the value of an identification information bit in a physical frame header and/or a media access control frame header of the broadcast message is a first value, the broadcast message is an infrastructure service information discovery message, and the infrastructure service information discovery message includes specific information of infrastructure service information; and the wireless transceiving module, configured to exchange data with the outside of the infrastructure service communication device. In this technical scheme, the infrastructure service communication device may be a mobile phone, a flat computer, a notebook computer or the like and may be used as an STA, the service processing module is equivalent to a chip for processing wireless local area network services, and the wireless transceiving module is equivalent to an antenna for transceiving wireless local area network signals. When the STA receives a message, the STA may judge whether the message is an ISD message only by reading the physical frame header or the MAC frame header of the ISD message, and if the STA does not need the service information, the STA may neglect the message and does not need to analyze the ISD message, thus saving a large amount of power for the STA.

In the above technical scheme, preferably, the identification information bit includes one or more bits in a signal domain of the physical frame header, and/or one or more bits in a frame control domain of the media access control frame header. In this technical scheme, the STA may judge whether the message is an ISD message according to the value of the specific bit of the physical frame header or the MAC frame header and does not need to analyze the specific information therein, so that power is saved.

In the above technical scheme, preferably, the identification information bit includes an infrastructure service discovery (ISD)/beacon frame message indication bit in the signal domain of the physical frame header, and/or one or more bits in a type sub-domain and a subtype sub-domain of the frame control domain of the media access control frame header. In this technical scheme, whether the broadcast message is an ISD message may be judged according to a reserved bit (serving as the ISD/Beacon message indication bit) of the SIG domain in the physical frame header and the Type sub-domain and the Subtype sub-domain in the FC domain of the MAC frame header. Those skilled in the art should understand that, based on the format change of the ISD message, the AP may also select other bits to identify the broadcast message, and the STA identifies the message according to the value of the corresponding bit.

In the above technical scheme, preferably, when the broadcast message is the infrastructure service information discovery message, if the infrastructure service information discovery message does not include the specific information needed by a user, or the user does not need any specific information of the infrastructure service information, the service processing module calculates the arrival time of next beacon frame after the infrastructure service information discovery message according to a timestamp and a beacon interval in the infrastructure service information discovery message, to receive the next beacon frame via the wireless transceiving module. In this technical scheme, when the STA does not need the ISD message or the ISD message does not include the service information needed by the STA, the STA may directly wait for processing of next Beacon frame, establish a connection or judge the arrival time of an ISD message including service information needed by the STA according to the Beacon frame, may not process other messages before the Beacon frame arrives but directly enters dormancy, so that a large amount of power is saved. In the above technical scheme, preferably, the infrastructure service information communication device further carries out dormancy before the arrival time of the next beacon frame. In this technical scheme, the device carries out dormancy before the Beacon frame arrives, thus further saving power for the STA.

In the above technical scheme, preferably, the device further includes: a first setting module, configured to set a specific information type needed by a user, wherein the service processing module judges whether the infrastructure service information discovery message includes the specific information needed by the user according to the specific information type. In this technical scheme, the user may preset the specific information type, so that when the STA identifies that the ISD message does not include the specific service information needed by the user, the STA favorably does not completely analyze the contents of the ISD message for the user, which is also favorable for saving power for the STA.

In the above technical scheme, preferably, when the value of the identification information bit is a second value, the broadcast message is a beacon frame, wherein the beacon frame includes multiple index messages of the infrastructure service information and broadcast time points of corresponding specific information of the multiple index messages; and when the broadcast message is the beacon frame, the service processing module calculates the arrival time of an infrastructure service information discovery message including the specific information needed by the user according to the multiple index messages and the broadcast time points, to receive the infrastructure service information discovery message including the specific information needed by the user via the wireless transceiving module or carry out an initial connection with the access point. In this technical scheme, the arrival time of the ISD message including the service information needed by the user may be judged according to the index messages and the broadcast timestamp of the Beacon frame, other messages arriving before the ISD message may not be processed, and the device directly enters dormancy, so that a large amount of power is saved.

In the above technical scheme, preferably, the infrastructure service information communication device further carries out dormancy before the arrival time of the infrastructure service information discovery message including the specific information needed by the user. In this technical scheme, the device carries out dormancy before the ISD message including the service information needed by the user arrives, thus further saving power for the STA.

In the above technical scheme, preferably, the device further includes: a second setting module, configured to set an index message type corresponding to the specific information needed by the user, and calculate the arrival time of the infrastructure service information discovery message including the specific information needed by the user according to the index message type, the multiple index messages and the broadcast time points. In this technical scheme, the user may preset the index message type, and the STA favorably judges the arrival time of the ISD message including the service information needed by the user according to the index message in the Beacon frame and does not process other broadcast messages received previously, which is also favorable for saving power for the STA.

The present invention further provides an infrastructure service information communication method, including: receiving a broadcast message; when the value of an identification information bit in a physical frame header and/or a media access control frame header of the broadcast message is a first value, the broadcast message being an infrastructure service information discovery message, wherein the infrastructure service information discovery message includes specific information of infrastructure service information. In this technical scheme, when the STA receives a message, the STA may judge whether the message is an ISD message only by reading the physical frame header or the MAC frame header of the ISD message, and if the STA does not need the service information, the STA may neglect the message and does not need to analyze the ISD message, thus saving a large amount of power for the STA.

In the above technical scheme, preferably, the identification information bit includes one or more bits in a signal domain of the physical frame header, and/or one or more bits in a frame control domain of the media access control frame header. In this technical scheme, the STA may judge whether the message is the ISD message according to the value of the specific bit of the physical frame header or the MAC frame header and does not need to analyze the specific information therein, so that power is saved.

In the above technical scheme, preferably, the identification information bit includes an infrastructure service discovery (ISD)/beacon message indication bit in the signal domain of the physical frame header, and/or one or more bits in a type sub-domain and a subtype sub-domain of the frame control domain of the media access control frame header. In this technical scheme, whether the broadcast message is an ISD message may be judged according to the values of a reserved bit (serving as the ISD/Beacon message indication bit) of the SIG domain in the physical frame header and the Type sub-domain and the Subtype sub-domain in the FC domain of the MAC frame header. Those skilled in the art should understand that, based on the format change of the ISD message, the AP may also select other bits to identify the broadcast message, and the STA identifies the message according to the value of the corresponding bit.

In the above technical scheme, preferably, the method further includes: when the broadcast message is the infrastructure service information discovery message, if the infrastructure service information discovery message does not include the specific information needed by a user, or the user does not need any specific information of the infrastructure service information, calculating the arrival time of next beacon frame after the infrastructure service information discovery message according to a timestamp and a beacon interval in the infrastructure service information discovery message, to acquire the next beacon frame. In this technical scheme, when the STA does not need the ISD message or the ISD message does not include the service information needed by the STA, the STA may directly wait for processing of next Beacon frame, establish a connection or judge the arrival time of an ISD message including service information needed by the STA according to the Beacon frame, may not process other messages before the Beacon frame arrives but directly enters dormancy, so that a large amount of power is saved.

In the above technical scheme, preferably, the method further includes: carrying out dormancy before the arrival time of the next beacon frame. In this technical scheme, the STA carries out dormancy before the Beacon frame arrives, thus further saving power for the STA.

In the above technical scheme, preferably, the method further includes: setting a specific information type needed by a user, and judging whether the infrastructure service information discovery message includes the specific information needed by the user according to the specific information type. In this technical scheme, the user may preset the specific information type, so that when the STA identifies that the ISD message does not include the specific service information needed by the user, the STA favorably does not completely analyze the contents of the ISD message for the user, which is also favorable for saving power for the STA.

In the above technical scheme, preferably, the method further includes: when the value of the identification information bit is a second value, the broadcast message being a beacon frame, wherein the beacon frame includes multiple index messages of the infrastructure service information and broadcast time points of corresponding specific information of the multiple index messages; and when the broadcast message is the beacon frame, calculating the arrival time of an infrastructure service information discovery message including the specific information needed by the user according to the multiple index messages and the broadcast time points, to acquire the infrastructure service information discovery message including the specific information needed by the user or carry out an initial connection with the access point. In this technical scheme, the arrival time of the ISD message including the service information needed by the user may be judged according to the index messages and the broadcast timestamp of the Beacon frame, and other messages arriving before the ISD message may not be processed, so that a large amount of power is saved.

In the above technical scheme, preferably, the method further includes: carrying out dormancy before the arrival time of the infrastructure service information discovery message including the specific information needed by the user. In this technical scheme, dormancy is carried out before the ISD message including the service information needed by the user arrives, thus further saving power for the STA.

In the above technical scheme, preferably, the method further includes: setting an index message type corresponding to the specific information needed by the user, and calculating the arrival time of the infrastructure service information discovery message including the specific information needed by the user according to the index message type, the multiple index messages and the broadcast time points. In this technical scheme, the user may preset the index message type, and the STA favorably judges the arrival time of the ISD message including the service information needed by the user according to the index message in the Beacon frame and does not process other broadcast messages received previously, which is also favorable for saving power for the STA.

Through the above technical schemes, the infrastructure service information communication device and the infrastructure service information communication method may be implemented. After the STA receives the broadcast message of the AP, the STA may judge the type of the received broadcast message from the physical frame header or the MAC frame header of the broadcast message, may judge whether the broadcast message is the desired information according to the type of the broadcast message, and does not need to receive all broadcast messages for analyzing, which is favorable for power saving of the STA.

BRIEF DESCRIPTION OF THE DRAWINGS

FIG. 8 is a partial schematic diagram of a broadcast message transmitted by an infrastructure service information communication device according to an embodiment of the present invention;

FIG. 9 is a working flow diagram of an infrastructure service information communication device according to an embodiment of the present invention.

DETAILED DESCRIPTION OF THE EMBODIMENTS

To understand the above purposes, features and advantages of the present invention more clearly, the present invention will be further described in detail below in combination with the accompanying drawings and the specific implementations. It should be noted that, the embodiments of the present application and the features in the embodiments may be combined with one another without conflicts.

Many specific details will be described below for sufficiently understanding the present invention. However, the present invention may also be implemented by adopting other manners different from those described herein. Accordingly, the protection scope of the present invention is not limited by the specific embodiments disclosed below.

Figure 1:
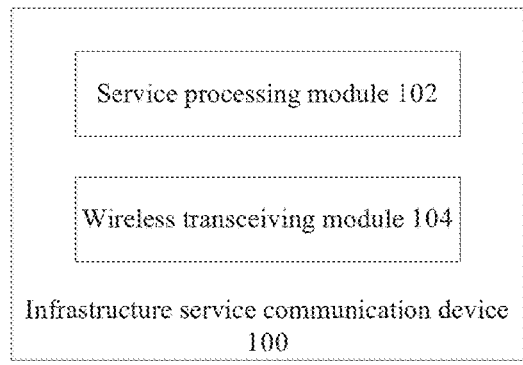
FIG. 1 is a block diagram of an infrastructure service information communication device according to an embodiment of the present invention.

FIG. 1 is a block diagram of an infrastructure service information communication device according to an embodiment of the present invention.

As shown in FIG. 1, the present invention provides an infrastructure service communication device 100, including: a service processing module 102, configured to generate a broadcast message, wherein a physical frame header and/or a media access control frame header of the broadcast message include an identification information bit, the value of the identification information bit is a first value when the broadcast message is an infrastructure service information discovery message, and the infrastructure service information discovery message includes specific information of infrastructure service information; and a wireless transceiving module 104, configured to exchange data with the outside of the infrastructure service communication device 100, wherein the service processing module transmits the broadcast message via the wireless transceiving module. In this technical scheme, the infrastructure service information communication device may be a router, a mobile phone, a flat computer, a notebook computer or the like and may be used as an AP, the service processing module 102 is equivalent to a chip for processing wireless local area network services, and the wireless transceiving module 104 is equivalent to an antenna for transceiving wireless local area network signals. Through this scheme, when the AP transmits the ISD message including the specific service information, the AP may identify the ISD message, then when the STA receives a message, the STA may judge whether the message is an ISD message only by reading the physical frame header or the MAC frame header of the ISD message without analyzing all ISD messages, and when the STA does not need the infrastructure service information, the STA does not analyze the ISD message, thus saving power for the STA.

In the above technical scheme, the identification information bit includes one or more bits in a signal domain of the physical frame header, and/or one or more bits in a frame control domain of the media access control frame header. In this technical scheme, the implemented identification is simple and feasible, and it is ensured that the STA may judge whether the message is an ISD message according to the value of the specific bit of the physical frame header or the MAC frame header and does not need to analyze the specific information therein, so that power is saved.

In the above technical scheme, the identification information bit includes an infrastructure service discovery (ISD)/beacon frame message indication bit in the signal domain of the physical frame header, and/or one or more bits in a type sub-domain and a subtype sub-domain of the frame control domain of the media access control frame header. In this technical scheme, a reserved bit (serving as the ISD/Beacon message indication bit) of the SIG (signal) domain in the physical frame header and the Type sub-domain and the Subtype sub-domain in the FC (Frame Control) domain of the MAC frame header may be used for setting an identification. Those skilled in the art should understand that, based on the format change of the ISD message, the identification information may also be set by selecting other bits.

In the above technical scheme, the infrastructure service information discovery message further includes a timestamp and a beacon interval, and is then broadcasted. In this technical scheme, after the AP adds the Beacon Interval and the timestamp to the ISD message, the STA may know the arrival time of next Beacon frame according to the Beacon Interval, and it is ensured that the STA may be synchronized with the AP on time according to the timestamp, and if the ISD message received by the STA is not the information needing to be learnt by the STA, the STA may directly enter dormancy till the next Beacon frame arrives, which is favorable for saving power for the STA.

In the above technical scheme, when the broadcast message is a beacon frame, the value of the identification information bit is a second value, wherein the beacon frame includes an index message of the infrastructure service information and broadcast time points of all corresponding specific information of the index message. In this technical scheme, if the identification information bit is set in the physical frame header of the Beacon frame, it may be ensured that after the STA receives a message, the STA may judge whether the message is a Beacon frame only according to the physical frame header, and then the STA may further analyze the MAC frame part of the received message to obtain the needed information or directly establish an initial connection with the AP.

Figure 2:
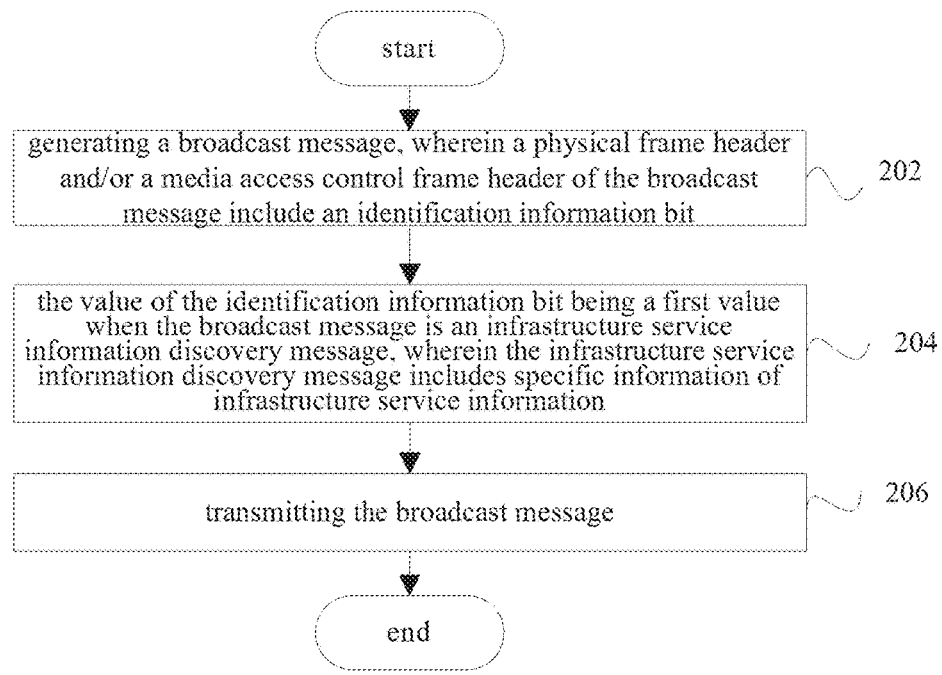
FIG. 2 is a flow diagram of an infrastructure service information communication method according to an embodiment of the present invention.

FIG. 2 is a flow diagram of an infrastructure service information communication method according to an embodiment of the present invention.

As shown in FIG. 2, the present invention further provides an infrastructure service information communication method, including: step 202, generating a broadcast message, wherein a physical frame header and/or a media access control frame header of the broadcast message include an identification information bit; step 204, the value of the identification information bit being a first value when the broadcast message is an infrastructure service information discovery message, wherein the infrastructure service information discovery message includes specific information of infrastructure service information; and step 206, transmitting the broadcast message. In this technical solution, when the AP transmits the ISD message including the specific service information, the AP may identify the ISD message, then when the STA receives a message, the STA may judge whether the message is an ISD message only by reading the physical frame header or the MAC frame header of the ISD message without analyzing all ISD messages, and when the STA does not need the infrastructure service information, the STA does not analyze the ISD message, thus saving power for the STA.

In the above technical scheme, the identification information bit includes one or more bits in a signal domain of the physical frame header, and/or one or more bits in a frame control domain of the media access control frame header. In this technical scheme, the implemented identification is simple and feasible, and it is ensured that the STA may judge whether the message is an ISD message according to the value of the specific bit of the physical frame header or the MAC frame header and does not need to analyze the specific information therein, so that power is saved.

In the above technical scheme, the identification information bit includes an infrastructure service discovery (ISD)/beacon frame message indication bit in the signal domain of the physical frame header, and/or one or more bits in a type sub-domain and a subtype sub-domain of the frame control domain of the media access control frame header. In this technical scheme, a reserved bit (serving as the ISD/Beacon message indication bit) of the SIG (signal) domain in the physical frame header and the Type sub-domain and the Subtype sub-domain in the FC (Frame Control) domain of the MAC frame header may be used for setting an identification. Those skilled in the art should understand that, based on the format change of the ISD message, the identification information may also be set by selecting other bits.

In the above technical scheme, the infrastructure service information discovery message further includes a timestamp and a beacon interval. In this technical scheme, after the AP adds the Beacon Interval and the timestamp to the ISD message, the STA may know the arrival time of next Beacon frame according to the Beacon Interval, and it is ensured that the STA may be synchronized with the AP on time according to the timestamp, and if the ISD message received by the STA is not the information needing to be learnt by the STA, the STA may directly enter dormancy till the next Beacon frame arrives, which is favorable for saving power for the STA.

In the above technical scheme, step 204 further includes: the value of the identification information bit being a second value when the broadcast message is a beacon frame, wherein the beacon frame includes an index message of the infrastructure service information and broadcast time points of all corresponding specific information of the index message. In this technical scheme, if the identification information bit is set in the physical frame header of the Beacon frame, it may be ensured that after the STA receives a message, the STA may judge whether the message is a Beacon frame only according to the physical frame header, and then the STA may further analyze the MAC frame part of the received message to obtain the needed information or directly establish an initial connection with the AP.

Figure 3:
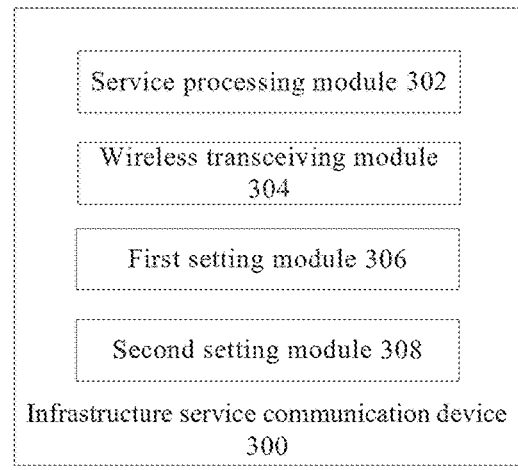
FIG. 3 is a block diagram of an infrastructure service information communication device according to an embodiment of the present invention.

FIG. 3 is a block diagram of an infrastructure service information communication device according to an embodiment of the present invention.

As shown in FIG. 3, the present invention further provides an infrastructure service information communication device 300, including: a service processing module 302, configured to receive a broadcast message via a wireless transceiving module 304, wherein when the value of an identification information bit in a physical frame header and/or a media access control frame header of the broadcast message is a first value, the broadcast message is an infrastructure service information discovery message, and the infrastructure service information discovery message includes specific information of infrastructure service information; and the wireless transceiving module 304, configured to exchange data with the outside of the infrastructure service information communication device 300. In this technical scheme, the infrastructure service information communication device may be a mobile phone, a flat computer, a notebook computer or the like and may be used as an STA, the service processing module 302 is equivalent to a chip for processing wireless local area network services, and the wireless transceiving module 304 is equivalent to an antenna for transceiving wireless local area network signals. When the STA receives a message, the STA may judge whether the message is an ISD message only by reading the physical frame header or the MAC frame header of the ISD message, and if the STA does not need the service information, the STA may neglect the message and does not need to analyze the ISD message, thus saving a large amount of power for the STA.

In the above technical scheme, the identification information bit includes one or more bits in a signal domain of the physical frame header, and/or one or more bits in a frame control domain of the media access control frame header. In this technical scheme, the STA may judge whether the message is an ISD message according to the value of the specific bit of the physical frame header or the MAC frame header and does not need to analyze the specific information therein, so that power is saved.

In the above technical scheme, the identification information bit includes an infrastructure service discovery (ISD)/beacon frame message indication bit in the signal domain of the physical frame header, and/or one or more bits in a type sub-domain and a subtype sub-domain of the frame control domain of the media access control frame header. In this technical scheme, it is exemplified that whether the broadcast message is an ISD message may be judged according to a reserved bit (serving as the ISD/Beacon message indication bit) of the SIG domain in the physical frame header and the Type sub-domain and the Subtype sub-domain in the FC domain of the MAC frame header. Those skilled in the art should understand that, based on the format change of the ISD message, the AP may also select other bits to identify the broadcast message, and the STA identifies the message according to the value of the corresponding bit.

In the above technical scheme, when the broadcast message is the infrastructure service information, if the infrastructure service information discovery message does not include the specific information needed by a user, or the user does not need any specific information of the infrastructure service information, the service processing module 302 calculates the arrival time of next beacon frame after the infrastructure service information discovery message according to a timestamp and a beacon interval in the infrastructure service information discovery message, to receive the next beacon frame via the wireless transceiving module 304. In this technical scheme, when the STA does not need the ISD message or the ISD message does not include the service information needed by the STA, the STA may directly wait for processing of next Beacon frame, establish a connection or judge the arrival time of an ISD message including service information needed by the STA according to the Beacon frame, may not process other messages before the Beacon frame arrives but directly enters dormancy, so that a large amount of power is saved.

In the above technical scheme, the infrastructure service information communication device 300 further carries out dormancy before the arrival time of the next beacon frame. In this technical scheme, the device carries out dormancy before the Beacon frame arrives, thus further saving power for the STA.

In the above technical scheme, the device further includes: a first setting module 306, configured to set a specific information type needed by a user, wherein the service processing module 302 judges whether the infrastructure service information discovery message includes the specific information needed by the user according to the specific information type. In this technical scheme, the user may preset the specific information type, so that when the STA identifies that the ISD message does not include the specific service information needed by the user, the STA favorably does not completely analyze the contents of the ISD message for the user, which is also favorable for saving power for the STA.

In the above technical scheme, when the value of the identification information bit is a second value, the broadcast message is a beacon frame, wherein the beacon frame includes multiple index messages of the infrastructure service information and broadcast time points of corresponding specific information of the multiple index messages; and when the broadcast message is the beacon frame, the service processing module 302 calculates the arrival time of an infrastructure service information discovery message including the specific information needed by the user according to the multiple index messages and the broadcast time points, to receive the infrastructure service information discovery message including the specific information needed by the user via the wireless transceiving module 304 or directly establish an initial connection with the AP. In this technical scheme, the arrival time of the ISD message including the service information needed by the user may be judged according to the index messages and the broadcast timestamp of the Beacon frame, and other messages arriving before the ISD message may not be processed, so that a large amount of power is saved.

In the above technical scheme, the infrastructure service information communication device 300 further carries out dormancy before the arrival time of the infrastructure service information discovery message including the specific information needed by the user. In this technical scheme, the device carries out dormancy before the ISD message including the service information needed by the user arrives, thus further saving power for the STA.

In the above technical scheme, the device further includes: a second setting module 308, configured to set an index message type corresponding to the specific information needed by the user, and calculate the arrival time of the infrastructure service information discovery message including the specific information needed by the user according to the index message type, the multiple index messages and the broadcast time points. In this technical scheme, the user may preset the index message type, and the STA favorably judges the arrival time of the ISD message including the service information needed by the user according to the index message in the Beacon frame and does not process other broadcast messages received previously, which is also favorable for saving power for the STA.

Figure 4:
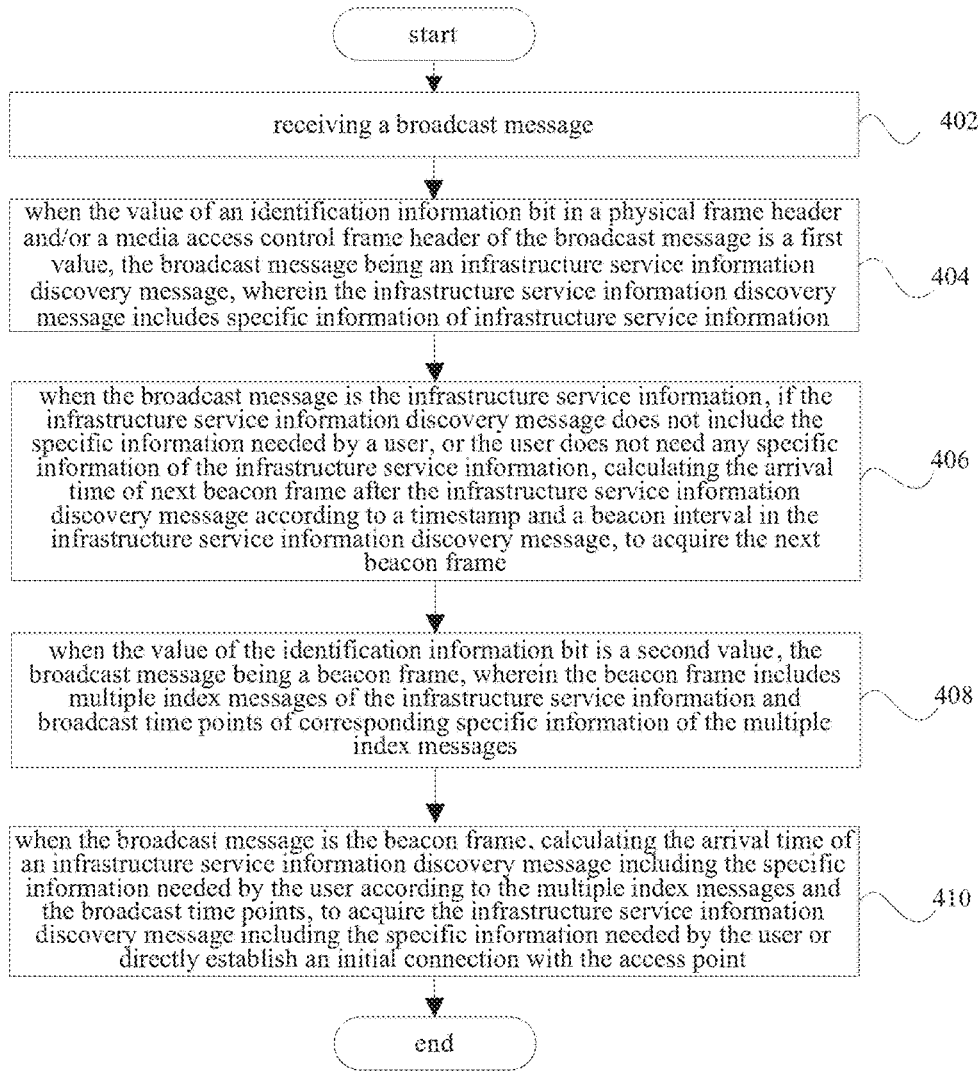
FIG. 4 is a flow diagram of an infrastructure service information communication method according to an embodiment of the present invention.

FIG. 4 is a flow diagram of an infrastructure service information communication method according to an embodiment of the present invention.

As shown in FIG. 4, the present invention further provides an infrastructure service information communication method, including: step 402, receiving a broadcast message; and step 404, when the value of an identification information bit in a physical frame header and/or a media access control frame header of the broadcast message is a first value, the broadcast message being an infrastructure service information discovery message, wherein the infrastructure service information discovery message includes specific information of infrastructure service information. In this technical scheme, when the STA receives a message, the STA may judge whether the message is an ISD message only by reading the physical frame header or the MAC frame header of the ISD message, and if the STA does not need the service information, the STA may neglect the message and does not need to analyze the ISD message, thus saving a large amount of power for the STA.

In the above technical scheme, the identification information bit includes one or more bits in a signal domain of the physical frame header, and/or one or more bits in a frame control domain of the media access control frame header. In this technical scheme, the STA may judge whether the message is the ISD message according to the value of the specific bit of the physical frame header or the MAC frame header and does not need to analyze the specific information therein, so that power is saved.

In the above technical scheme, the identification information bit includes an infrastructure service discovery (ISD)/beacon frame message indication bit in the signal domain of the physical frame header, and/or multiple bits in a type sub-domain and a subtype sub-domain of the frame control domain of the media access control frame header. In this technical scheme, it is exemplified that whether the broadcast message is an ISD message may be judged according to the values of a reserved bit (serving as the ISD/Beacon message indication bit) of the SIG domain in the physical frame header and the Type sub-domain and the Subtype sub-domain in the FC domain of the MAC frame header. Those skilled in the art should understand that, based on the format change of the ISD message, the AP may also select other bits to identify the broadcast message, and the STA identifies the message according to the value of the corresponding bit.

In the above technical scheme, the method further includes: step 406, when the broadcast message is the infrastructure service information, if the infrastructure service information discovery message does not include the specific information needed by a user, or the user does not need any specific information of the infrastructure service information, calculating the arrival time of next beacon frame after the infrastructure service information discovery message according to a timestamp and a beacon interval in the infrastructure service information discovery message, to acquire the next beacon frame. In this technical scheme, when the STA does not need the ISD message or the ISD message does not include the service information needed by the STA, the STA may directly wait for processing of the next Beacon frame, establish a connection or judge the arrival time of an ISD message including service information needed by the STA according to the Beacon frame, may not process other messages before the Beacon frame arrives but directly enters dormancy, so that a large amount of power is saved.

In the above technical scheme, step 406 further includes: carrying out dormancy before the arrival time of the next beacon frame. In this technical scheme, the STA carries out dormancy before the Beacon frame arrives, thus further saving power for the STA.

In the above technical scheme, before step 406, the method further includes: setting a specific information type needed by a user, and judging whether the infrastructure service information discovery message includes the specific information needed by the user according to the specific information type. In this technical scheme, the user may preset the specific information type, so that when the STA identifies that the ISD message does not include the specific service information needed by the user, the STA favorably does not completely analyze the contents of the ISD message for the user, which is also favorable for saving power for the STA.

In the above technical scheme, the method further includes: step 408, when the value of the identification information bit is a second value, the broadcast message being a beacon frame, wherein the beacon frame includes multiple index messages of the infrastructure service information and broadcast time points of corresponding specific information of the multiple index messages; and step 410, when the broadcast message is the beacon frame, calculating the arrival time of an infrastructure service information discovery message including the specific information needed by the user according to the multiple index messages and the broadcast time points, to acquire the infrastructure service information discovery message including the specific information needed by the user or directly establish an initial connection with the AP. In this technical scheme, the arrival time of the ISD message including the service information needed by the user may be judged according to the index messages and the broadcast timestamp of the Beacon frame, and dormancy may be entered without processing other messages arriving before the ISD message, so that a large amount of power is saved.

In the above technical scheme, step 410 further includes: carrying out dormancy before the arrival time of the infrastructure service information discovery message including the specific information needed by the user. In this technical scheme, dormancy is carried out before the ISD message including the service information needed by the user arrives, thus further saving power for the STA.

In the above technical scheme, before step 410, the method further includes: setting an index message type corresponding to the specific information needed by the user, and calculating the arrival time of the infrastructure service information discovery message including the specific information needed by the user according to the index message type, the multiple index messages and the broadcast time points. In this technical scheme, the user may preset the index message type, and the STA favorably judges the arrival time of the ISD message including the service information needed by the user according to the index message in the Beacon frame and does not process other broadcast messages received previously, which is also favorable for saving power for the STA.

The technical schemes of the present invention will be described in detail below through an embodiment.

With respect to the possible problems of the ISD broadcast message (namely the message including detailed service information) analyzed above, how the AP and the STA implemented by the above infrastructure service information communication device process the ISD broadcast message will be described in detail in this embodiment, to ensure power saving of the STA.

Firstly, the AP needs to identify the ISD message:
1, in order to save power for the STA which does not need to learn the service information of the network side, the AP should carry out identification in the physical header or the MAC header to indicate whether the message is an ISD message. The specific implementation scheme is as follows:
a, identification is carried out in the physical frame head, namely the reserved bit in the SIG domain of the physical frame head is used as an ISD/Beacon message indication bit to identify whether the broadcast message is an ISD message. The SIG domain may be composed of different parts, and may only include an L-SIG (legacy signal) domain or only include an HT-SIG (high throughput signal, including two parts, namely HT-SIG$_1$ and HT-SIG$_2$) domain or include the both, wherein L is the abbreviation of Legacy, and HT is the abbreviation of high throughput).

Figure 5:
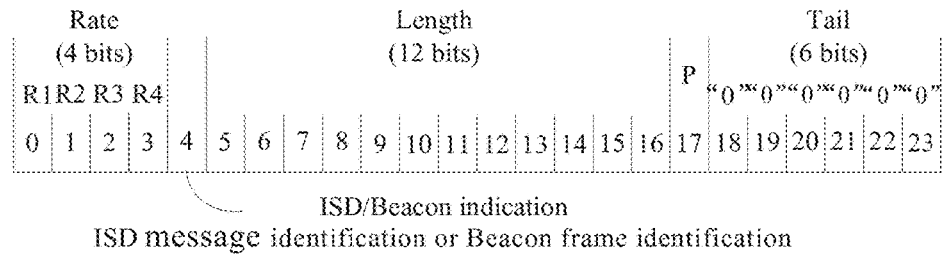
FIG. 5 is a partial schematic diagram of a broadcast message transmitted by an infrastructure service information communication device according to an embodiment of the present invention.

As shown in FIG. 5, the AP sets the value of the reserved bit (namely the 4$^{th}$ bit) of the L-SIG domain as ISD/Beacon indication (ISD message identification or Beacon message identification); if the bit is set as 0, it indicates that the message is ISD information (ISD message); and if the bit is set as 1, it indicates that the message is a Beacon frame.

Figure 6:
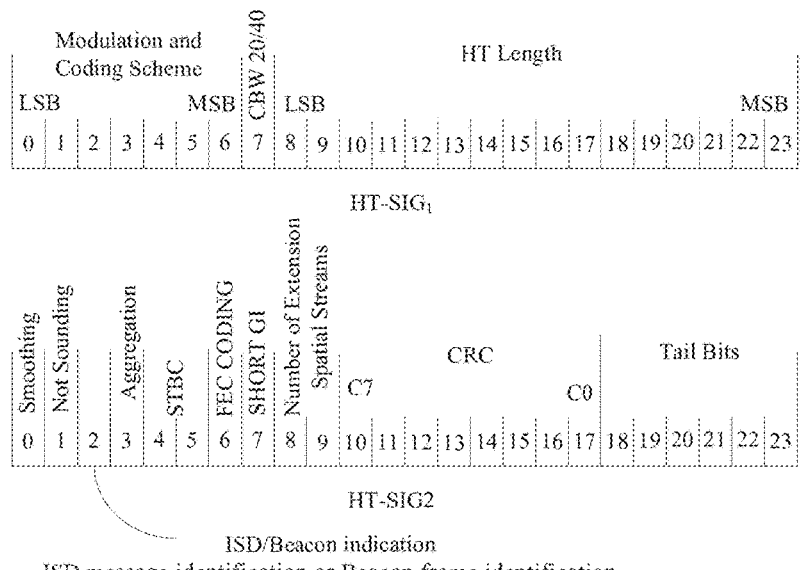
FIG. 6 is a partial schematic diagram of a broadcast message transmitted by an infrastructure service information communication device according to an embodiment of the present invention.
Figure 7:
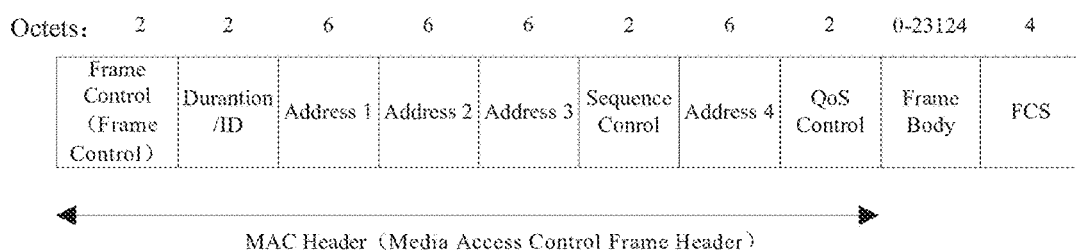
FIG. 7 is a partial schematic diagram of a broadcast message transmitted by an infrastructure service information communication device according to an embodiment of the present invention.

As shown in FIG. 6, the HT-SIG domain includes two parts, namely HT-SIG$_1$ and HT-SIG$_2$, wherein the part HT-SIG$_1$ has no reserved bit, so the AP sets the value of the reserved bit (namely the 2$^{nd}$ bit) of the HT-SIG$_2$ domain as ISD/Beacon indication (ISD message identification or Beacon message identification); if the bit is set as 0, it indicates that the message is ISD information (ISD message); and if the bit is set as 1, it indicates that the message is a Beacon frame.

b, the identification of the AP in the MAC frame header may be as shown in FIG. 7, and the FC (Frame control) domain in the MAC Header (MAC frame header) is utilized. Further, the expanded FC domain is specifically as shown in FIG. 8, and the AP may use the Type sub-domain and the Subtype sub-domain in the FC domain as identification information bits. Specifically, the Type sub-domain includes bits b2 and b3, the Subtype sub-domain includes bits b4, b5, b6 and b7, and the six bits are set as specific values for indicating the type of the message, e.g. according to present standards, if the message is a Beacon frame, b3*b*2 is set as 00, and b7*b*6*b*5*b*4 is set as 1000; and in this embodiment, when the message is an ISD message, b3*b*2 is set as 00, b7*b*6*b*5*b*4 is set as 0110 (reserved and not defined in the present standards), and the specific description may be as shown in the following table.

| Type value b3 b2 | Type description | Subtype value b7 b6 b5 b4 | Subtype description |
|---|---|---|---|
| 00 | Management | 0000 | Association request |
| 00 | Management | 0001 | Association response |
| 00 | Management | 0010 | Reassociation request |
| 00 | Management | 0011 | Reassociation response |
| 00 | Management | 0100 | Probe request |
| 00 | Management | 0101 | Probe response |
| 00 | Management | 0110 | ISD information |
| 00 | Management | 1000 | Beacon |
| 00 | Management | 1001 | ATIM |
| 00 | Management | 1010 | Disassociation |
| 00 | Management | 1011 | Authentication |
| 00 | Management | 1100 | Deauthentication |

2. The AP further defines the whole format of the ISD message as follows:

| Order | Information | Notes |
|---|---|---|
| 1 | Details of categories of information | |
| 2 | timestamp | STA synchronizes with AP using timestamp |
| 3 | Beacon interval | |

After the ISD message and the Beacon frame are processed by the AP, the message is broadcasted, and the STA receives the message and carries out the processing as shown in FIG. 9.

Step 902, the AP broadcasts the message.

Step 904, the STA receives the message broadcasted by the AP, and judges whether the message is a Beacon frame or an ISD message according to the value of the identification information bit, and specifically, the STA may extract the value of the ISD/beacon message indication bit of the SIG domain of the physical frame header of the message or extract the values of the Type sub-domain and the Subtype sub-domain of the MAC frame header according to the above setting of the AP in the message, to judge whether the message is a Beacon frame or an ISD message.

Step 906, when the received message is the Beacon frame, if the STA needs the service information, the Beacon frame is processed in combination with a user setting condition (for determining the specific service information relevant to which type of index messages is needed by a user) in the STA to judge the arrival time of the ISD message including the needed service information, and the service processing module therein enters a sleep state till the ISD message arrives, and if the STA does not need the service information, the STA needs to carry out other services with the AP and starts to establish an initial connection with the AP.

Step 908, when the received message is the ISD message, whether the service information included in the ISD message is the needed service information is judged in combination with the user setting condition (for determining the specific service information of which types is needed by the user) in the STA.

Step 910, if the message does not include the needed service information, the STA calculates the arrival time of next Beacon frame according to a Beacon Interval and a timestamp in the message, and enables the wireless local area network service function to enter a sleep state till the Beacon frame arrives.

Step 912, if the message includes the needed service information, the STA processes the message to acquire detailed service information in the ISD message for use by itself.

In conclusion, through the technical schemes of the present invention, the infrastructure service information communication device and the infrastructure service communication method may be implemented, so that the STA may save a large amount of power in a process of carrying out infrastructure network service discovery, which is also favorable for power saving of those STAs that are not engaged in the infrastructure network discovery.

The foregoing descriptions are merely preferred embodiments of the present invention, rather than limiting the present invention. Various modifications and alterations may be made to the present invention for those skilled in the art. Any modification, equivalent substitution, improvement or the like made within the spirit and principle of the present invention shall fall into the protection scope of the present invention.

The invention claimed is:

1. An infrastructure service information communication device, comprising:
    a service processor, configured to generate a broadcast message, wherein a physical frame header and/or a media access control frame header of the broadcast message comprise an identification information bit, a value of the identification information bit is a first value when the broadcast message is an infrastructure service information discovery message, and the infrastructure service information discovery message comprises specific information of infrastructure service information; and
    a wireless transceiver, configured to exchange data with an outside of the infrastructure service information communication device, wherein the service processor transmits the broadcast message via the wireless transceiver;
    wherein when the broadcast message is a beacon frame, the value of the identification information bit is a second value, wherein the beacon frame comprises an index message of the infrastructure service information and broadcast time points of corresponding specific information of the index message.

2. The infrastructure service information communication device of claim 1, wherein the identification information bit comprises one or more bits in a signal domain of the physical frame header, and/or one or more bits in a frame control domain of the media access control frame header.

3. The infrastructure service information communication device of claim 2, wherein the identification information bit comprises an infrastructure service discovery/beacon frame message indication bit in the signal domain of the physical frame header, and/or one or more bits in a type sub-domain and a subtype sub-domain of the frame control domain of the media access control frame header.

4. The infrastructure service information communication device of claim 1, wherein the infrastructure service information discovery message further comprises a timestamp and a beacon interval.

5. An infrastructure service information communication method, comprising:
    generating a broadcast message;
    a physical frame header and/or a media access control frame header of the broadcast message comprising an identification information bit;
    when the broadcast message is an infrastructure service information discovery message, a value of the identification information bit being a first value, wherein the infrastructure service information discovery message comprises specific information of infrastructure service information;
    transmitting the broadcast message;
    wherein the value of the identification information bit is a second value when the broadcast message is a beacon frame, wherein the beacon frame comprises an index message of the infrastructure service information and broadcast time points of all corresponding specific information of the index message.

6. The infrastructure service information communication method of claim 5, wherein the identification information bit comprises one or more bits in a signal domain of the physical frame header, and/or one or more bits in a frame control domain of the media access control frame header.

7. The infrastructure service information communication method of claim 6, wherein the identification information bit comprises an infrastructure service discovery/beacon frame message indication bit in the signal domain of the physical frame header, and/or one or more bits in a type sub-domain and a subtype sub-domain of the frame control domain of the media access control frame header.

8. The infrastructure service information communication method of claim 5, wherein the infrastructure service information discovery message further comprises a timestamp and a beacon interval.

9. An infrastructure network service communication device, comprising:
   a service processor, configured to receive a broadcast message via a wireless transceiver, wherein when a value of an identification information bit in a physical frame header and/or a media access control frame header of the broadcast message is a first value, the broadcast message is an infrastructure service information discovery message, and the infrastructure service information discovery message comprises specific information of infrastructure service information; and
   the wireless transceiver, configured to exchange data with an outside of the infrastructure service information communication device;
   wherein when the value of the identification information bit is a second value, the broadcast message is a beacon frame, wherein the beacon frame comprises multiple index messages of the infrastructure service information and broadcast time points of corresponding specific information of the multiple index messages; and when the broadcast message is the beacon frame, the service processor calculates the arrival time of an infrastructure service information discovery message comprising the specific information needed by the user according to the multiple index messages and the broadcast time points, to receive the infrastructure service information discovery message comprising the specific information needed by the user via the wireless transceiver or carry out an initial connection with the access point.

10. The infrastructure service information communication device of claim 9, wherein the identification information bit comprises one or more bits in a signal domain of the physical frame header, and/or one or more bits in a frame control domain of the media access control frame header.

11. The infrastructure service information communication device of claim 10, wherein the identification information bit comprises an infrastructure service discovery/beacon frame message indication bit in the signal domain of the physical frame header, and/or one or more bits in a type sub-domain and a subtype sub-domain of the frame control domain of the media access control frame header.

12. The infrastructure service information communication device of claim 9, wherein when the broadcast message is the infrastructure service information discovery message, if the infrastructure service information discovery message does not comprise the specific information needed by a user, or the user does not need any specific information of the infrastructure service information, the service processor calculates the arrival time of next beacon frame after the infrastructure service information discovery message according to a timestamp and a beacon interval in the infrastructure service information discovery message, to receive the next beacon frame via the wireless transceiver.

13. The infrastructure service information communication device of claim 12, wherein the infrastructure service information communication device further carries out dormancy before the arrival time of the next beacon frame.

14. The infrastructure service information communication device of claim 13, further comprising:
   a first setting unit, configured to set a specific information type needed by a user, wherein the service processor judges whether the infrastructure service information discovery message comprises the specific information needed by the user according to the specific information type.

15. An infrastructure service information communication method, comprising:
   receiving a broadcast message;
   when a value of an identification information bit in a physical frame header and/or a media access control frame header of the broadcast message is a first value, the broadcast message being an infrastructure service information discovery message, wherein the infrastructure service information discovery message comprises specific information of infrastructure service information;
   when the value of the identification information bit is a second value, the broadcast message being a beacon frame, wherein the beacon frame comprises multiple index messages of the infrastructure service information and broadcast time points of corresponding specific information of the multiple index messages; and
   when the broadcast message is the beacon frame, calculating the arrival time of an infrastructure service information discovery message comprising the specific information needed by the user according to the multiple index messages and the broadcast time points, to acquire the infrastructure service information discovery message comprising the specific information needed by the user or carry out an initial connection with the access point.

16. The infrastructure service information communication method of claim 15, wherein the identification information bit comprises one or more bits in a signal domain of the physical frame header, and/or one or more bits in a frame control domain of the media access control frame header.

17. The infrastructure service information communication method of claim 16, wherein the identification information bit comprises an infrastructure service discovery/beacon frame message indication bit in the signal domain of the physical frame header, and/or one or more bits in a type sub-domain and a subtype sub-domain of the frame control domain of the media access control frame header.

18. The infrastructure service information communication method of claim 15, further comprising:
   when the broadcast message is the infrastructure service information discovery message, if the infrastructure service information discovery message does not comprise the specific information needed by a user, or the user does not need any specific information of the infrastructure service information, calculating the arrival time of next beacon frame after the infrastructure service information discovery message according to a timestamp and a beacon interval in the infrastructure service information discovery message, to acquire the next beacon frame.

19. The infrastructure service information communication method of claim 18, further comprising:
   carrying out dormancy before the arrival time of the next beacon frame.

20. The infrastructure service information communication method of claim 18, further comprising:

setting a specific information type needed by a user, and judging whether the infrastructure service information discovery message comprises the specific information needed by the user according to the specific information type.

* * * * *